United States Patent
Grillon et al.

(10) Patent No.: US 12,135,088 B2
(45) Date of Patent: Nov. 5, 2024

(54) SEALING DEVICE FOR A CASING

(71) Applicant: Poclain Hydraulics Industrie, Verberie (FR)

(72) Inventors: Gilles Grillon, Verberie (FR); Julien Engrand, Verberie (FR)

(73) Assignee: Poclain Hydraulics Industrie (FR)

( * ) Notice: Subject to any disclaimer, the term of this patent is extended or adjusted under 35 U.S.C. 154(b) by 107 days.

(21) Appl. No.: 17/910,255

(22) PCT Filed: Feb. 22, 2021

(86) PCT No.: PCT/FR2021/050305
§ 371 (c)(1),
(2) Date: Sep. 8, 2022

(87) PCT Pub. No.: WO2021/181022
PCT Pub. Date: Sep. 16, 2021

(65) Prior Publication Data
US 2023/0097920 A1  Mar. 30, 2023

(30) Foreign Application Priority Data
Mar. 9, 2020 (FR) ...................................... 2002323

(51) Int. Cl.
*F16J 15/34* (2006.01)
*B62D 55/088* (2006.01)

(52) U.S. Cl.
CPC .......... *F16J 15/344* (2013.01); *B62D 55/088* (2013.01)

(58) Field of Classification Search
CPC ....................................................... F16J 15/344
See application file for complete search history.

(56) References Cited

U.S. PATENT DOCUMENTS

| | | | | |
|---|---|---|---|---|
| 3,180,648 | A * | 4/1965 | Kupfert | F16J 15/344 277/390 |
| 3,804,425 | A * | 4/1974 | Goodfellow | F16J 15/344 384/94 |
| 5,553,931 | A * | 9/1996 | Diekevers | B62D 55/15 305/193 |
| 10,343,733 | B2 * | 7/2019 | Iijima | B62D 55/088 |
| 2009/0085303 | A1 * | 4/2009 | Kometani | F16C 33/76 277/411 |
| 2015/0284042 | A1 * | 10/2015 | Kalmes | B62D 55/15 305/107 |
| 2021/0276637 | A1 * | 9/2021 | Suanno | B62D 55/14 |

FOREIGN PATENT DOCUMENTS

EP  0015739 A1  9/2017

* cited by examiner

*Primary Examiner* — Vishal A Patel
(74) *Attorney, Agent, or Firm* — Lippes Mathias LLP

(57) ABSTRACT

A casing for a rotating machine includes a first fixed segment, and a second segment rotating along an axis of rotation (X-X). The first segment and the second segment are in contact along an interface provided with a sealing element. The sealing element is positioned in a housing connected to the internal volume of the casing, and also to the surrounding medium. The connection between the housing and the surrounding medium is made via a duct. The first casing segment or the second casing segment has a planer positioned at an outer end of the duct.

10 Claims, 3 Drawing Sheets

SEALING DEVICE FOR A CASING

BACKGROUND OF THE DISCLOSURE

The present disclosure relates to a sealing device for a casing, of a rotating machine, in particular for application in a complex environment.

STATE OF THE ART

The use of rotating machines in environments qualified as extreme environments poses significant issues in terms of sealing. Indeed, hydraulic machines are here considered which are capable of being used in polluted environments, exposed to chemical products or splashes of material, debris, mud, snow, particles.

Different sealing structures have been proposed to ensure a good sealing between the internal volume of the rotating machine and the external medium. However, the known solutions remain problematic in terms of reliability, in particular over time.

The hydraulic machines include a fixed segment and a rotating segment, and a seal system to ensure the hydraulic oil sealing of the case. The service life of the machine depends on the service life of the seal. The seals can be made of rubber or can be metallic. The service life of the machine is improved if the seal is protected from dirt. Particularly, the oil-tight metal seals are robust and give a good service life, provided they are protected from contamination by abrasive particles and corrosion. The particles, for example sand and mud on the construction machines, cause abrasion that is detrimental to the service life of the seals, and particularly abrasion and corrosion of the metal seals.

It is known to hide the seals at the bottom of a depression. However, the latter can be filled with fine particles which can reach the seal, and which will rotate between the two rotating parts for a very long time without coming out. In addition, during the rotation, particles can be forced into the depression continuously, and sometimes urged under pressure.

The present disclosure thus aims to respond at least partially to these issues.

SUMMARY OF THE DISCLOSURE

To this end, the present disclosure relates to a casing for a rotating machine comprising a first fixed casing segment, and a second casing segment movable in rotation with respect to the first segment along an axis of rotation, the first casing segment and the second casing segment defining an internal volume and being in contact along an interface, the interface between the first casing segment and the second casing segment being provided with a sealing element, said sealing element being positioned in a housing connected to the internal volume of the casing on the one hand, and to the surrounding medium on the other hand, the connection between the housing and the surrounding medium being made via a duct, characterized in that the first casing segment or the second casing segment comprises a planer positioned at an outer end of the duct.

According to one example, the sealing element is an axial seal.

According to one example, said axial seal comprises a first metal ring, a second metal ring, a first elastomeric ring and a second elastomeric ring, the first metal ring and the second metal ring being mounted bearing against each other along an axial direction defined by the axis of rotation, the first elastomeric ring being interposed between the first metal ring and a wall of the first casing segment, and the second elastomeric ring being interposed between the second metal ring and a wall of the second casing segment.

According to one example, the planer is formed on the first casing segment.

According to one example, the planer is formed by a wall of the first casing segment, inclined with respect to the axis of rotation.

According to one example, the duct connecting the housing to the surrounding medium comprises a first portion, a second portion and a third portion, extending successively along a radial direction with respect to the axis of rotation from the housing towards the surrounding medium, the first portion, the second portion and the third portion each extending radially with respect to the axis of rotation, and being formed such that two successive portions are not aligned radially with respect to the axis of rotation.

The first portion, the second portion and the third portion of the duct then typically have sections S1, S2 and S3 respectively, such that S1>S2>S3.

According to one example, the duct comprises ribs formed in the first casing segment and in the second casing segment so as to form baffles in said duct, and in which the first casing segment and/or the second casing segment have bores formed in said ribs, so as to define passages between the housing and the surrounding medium.

The first casing segment and the second casing segment then typically have bores formed in said ribs, forming respectively outer holes and inner holes, so as to define passages between the housing and the surrounding medium when said outer holes and inner holes are aligned.

According to one example, the planer is configured so as to scan, during the rotation of the hydraulic machine, a cylinder portion located radially around the outer holes of the casing.

According to one example, the outer holes and the inner holes have a cylindrical section of revolution, extending radially with respect to the axis of rotation.

According to one example, said casing comprises two sets of outer holes, disposed on either side of the planer.

The present disclosure also relates to a tracked vehicle comprising a hydraulic machine provided with a casing as defined above for the driving of a track, in which the planer is placed symmetrically with respect to a mud compaction area of the hydraulic machine.

According to one example, all or part of the outer holes are made so as to be oriented downwardly of the casing with respect to the direction of gravity.

BRIEF DESCRIPTION OF THE DRAWINGS

The invention and its advantages will be better understood upon reading the detailed description given below of various embodiments of the invention given by way of non-limiting examples.

DETAILED DESCRIPTION OF THE PREFERRED EMBODIMENTS

One exemplary embodiment of the invention is described below with reference to FIGS. 1 and 2.

Figure 1:
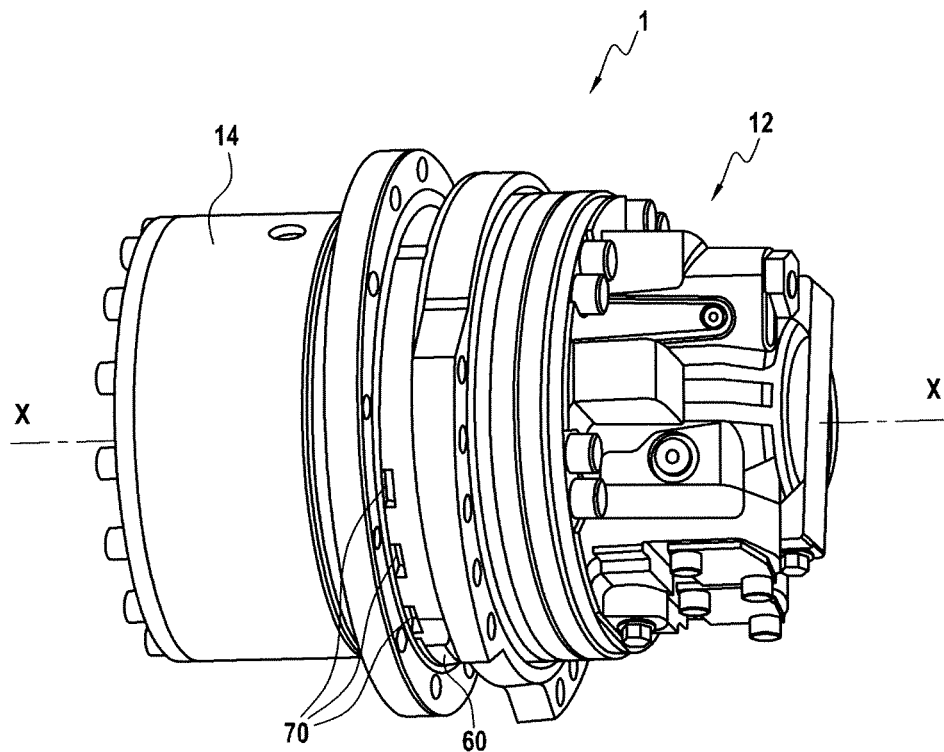
FIG. 1 is a side elevational view of a rotating machine casing in accordance with one aspect of the disclosure.

FIG. 1 represents an overview of a casing, or case 10 of a rotating machine. The casing comprises a first fixed segment 12 and a second segment 14 movable in rotation with respect to the first fixed segment 12 along an axis of rotation X-X. The casing 1 defines an internal volume. In the following description, the designations "radial" and "axial" are defined with respect to the axis of rotation X-X unless otherwise stated.

The casing 10 is for example a casing for a hydraulic machine, for example a hydraulic pump or a hydraulic motor, which can be a hydraulic machine with radial pistons or a hydraulic machine with axial pistons. The casing 10 is typically mounted in a vehicle, a machinery or a machine, for example to ensure a main hydraulic transmission or assistance of displacement members, wheels or tracks, or for example to ensure the actuation of a load, an arm, a turret, a hitch.

An interface is defined between the first segment 12 and the second segment 14, which corresponds to the contact surfaces between the first segment 12 and the second segment 14 of the casing 1. It is understood that in order to isolate the internal volume of the casing 1 with respect to the surrounding medium, it is necessary to ensure a sealing at this interface between the first segment 12 and the second segment 14.

Figure 2:
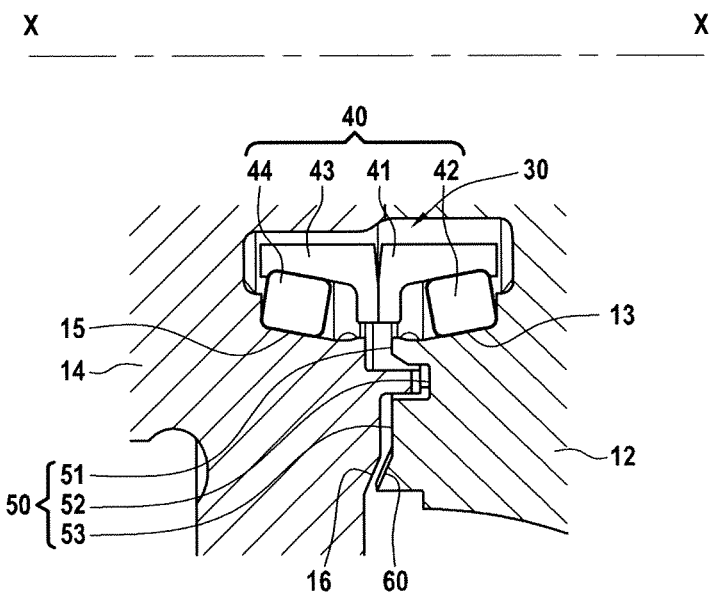
FIG. 2 is a cross-sectional view of a sealing element according to ene another aspect of the present disclosure.

FIG. 2 shows a sectional view of one example of a sealing structure according to one aspect of the present invention.

This figure represents a housing 30 formed at the interface between the first segment 12 and the second segment 14 of the casing 1. A sealing element 40 is disposed in the housing 30. In the example represented, the sealing element 40 is an axial seal, commonly referred to as floating seal, often designated by the trade name duo-cone. The sealing element 40 can for example be a metal floating seal, or a lip ring.

The sealing element 40 here comprises a first metal ring 41 and a second metal ring 43, made of metal material, and which are typically symmetrical with respect to a plane extending radially with respect to the axis of rotation X-X. The sealing element also comprises a first elastomeric ring 42 and a second elastomeric ring 44, made of elastomeric material.

The first metal ring 41 and the second metal ring 43 are bearing against each other along the axial direction defined by the axis of rotation X-X.

The first elastomeric ring 42 is mounted bearing against the first metal ring 41 on the one hand, and against a partition 13 of the first segment 12 of the casing 1.

The second elastomeric ring 44 is mounted bearing against the second metal ring 43 on the one hand, and against a partition 15 of the second segment 14 of the casing 1 on the other hand.

The first elastomeric ring 42 and the second elastomeric ring 44 are typically positioned radially outside with respect to first elastomeric ring 42 and to the second elastomeric ring 44. The first elastomeric ring 42 and the second elastomeric ring 44 compress the first elastomeric ring 42 and the second elastomeric ring 44 against the partitions 13 and 15 respectively of the first segment 12 and of the second segment 14, and thus ensure a sealed connection.

The first metal ring 41, the second metal ring 43 as well as the partitions 13 and 15 respectively of the first segment 12 and of the second segment 14 are typically formed so that the first elastomeric ring 42 and the second elastomeric ring 44 tend to move the first metal ring 41 and the second metal ring 43 against each other along the axial direction defined by the axis of rotation X-X.

The housing 30 is connected to the surrounding medium via a duct 50 extending typically radially around the housing 30.

The duct 50 as presented comprises three successive radial portions; a first portion 51, a second portion 52 and a third portion 53, extending successively between the housing 30 and the surrounding medium. These radial portions are typically connected by axial portions.

The first portion 51, the second portion 52 and the third portion 53 are formed so that two successive portions are not radially aligned. In the example illustrated, the first portion 51 and the third portion 53 are aligned radially, while the second portion 52 is offset with respect to the first portion 51 and to the third portion 53, so as to form a shoulder in the duct 50.

The duct 50 forms a protective baffle to prevent the particles from coming into contact with the sealing element 40. However, particles finer than the width of the duct 50 could penetrate it. It can be sand, earth or very fine dust, or mud which can be liquid upon its introduction, but which can fill the duct 50 and dry out. The duct 50 forming a baffle also aims to protect the sealing element 40 from direct spraying of fluids, such as water jets. Between the first portion 51 and the third portion 53, the duct 50 typically has a thickness on the order of 1 mm, the thickness being measured along the radial direction for an axial portion of the duct, and along the axial direction for a radial portion of the duct.

Furthermore, the first portion 51, the second portion 52 and the third portion 53 typically have sections S1, S2 and S3 respectively. These sections are typically such that S1>S2>S3, which allows a discharge of particles present in the housing 30 towards the surrounding medium, but reduces the infiltrations of particles from the surrounding medium towards the housing 30.

The second portion 52 and the third portion 53 are made by ribs forming low walls or protrusions along the axial direction which interpenetrate. These low walls or protrusions have recesses so as to form holes 70 which will be described later.

The outer end of the duct 50 is provided with a planer 60. "Outer end of the duct 50" denotes an end of the duct 50 opening out into the surrounding medium, as opposed to its inner end which opens out into the housing 30. The outer end is typically in the extension of the third portion 53.

The casing 1 as proposed thus has a housing 30 for the sealing element 40, this housing being connected to the surrounding medium by a duct 50 successively having a baffle then a planer 60.

The planer 60 is for example formed by a plane inclined with respect to the radial direction.

The planer 60 is typically formed in the first segment 12 of the casing 1 that is to say in the fixed segment of the casing 1. A surface 16 having a similar or identical inclination is then typically formed in the other casing segment, here in the second segment 14, facing the planer 60.

The planer 60 and the surface 16 define a passage having a section S4, typically such that S4<S3. In operation, the planer 60 and the surface 16 have a clearance which is typically constant, for example equal to 1 mm.

The relative movement of the surface 16 in front of the planer 60 during the relative rotation of the segments 12 and 14 of the casing 1 will take off the mud which adhered on the segment in rotation and discharge them in a direction opposite to the entry in the duct 50.

The planer 60 thus forms a scraper, which allows eliminating the impurities depositing or accumulating at the inlet of the duct 50. The planer 60 in particular allows eliminating the deposits of material having dried for example when the machinery or the apparatus in which the casing 1 is implanted is stationary, typically mud or sand.

The planer 60 is typically formed in an angular sector comprised between 1° and 30°, or for example between 5 and 20° about the axis of rotation X-X.

The planer 60 is typically formed in an angular sector opposite to an angular track driving sector in the case of an application for a vehicle equipped with tracks. The planer 60 is typically formed so as to be inclined at an angle comprised between 30 and 60°, or more specifically between 40 and 50°, or even equal to 45° with respect to a vertical direction when the casing is mounted on a machinery or a vehicle.

Figure 3:
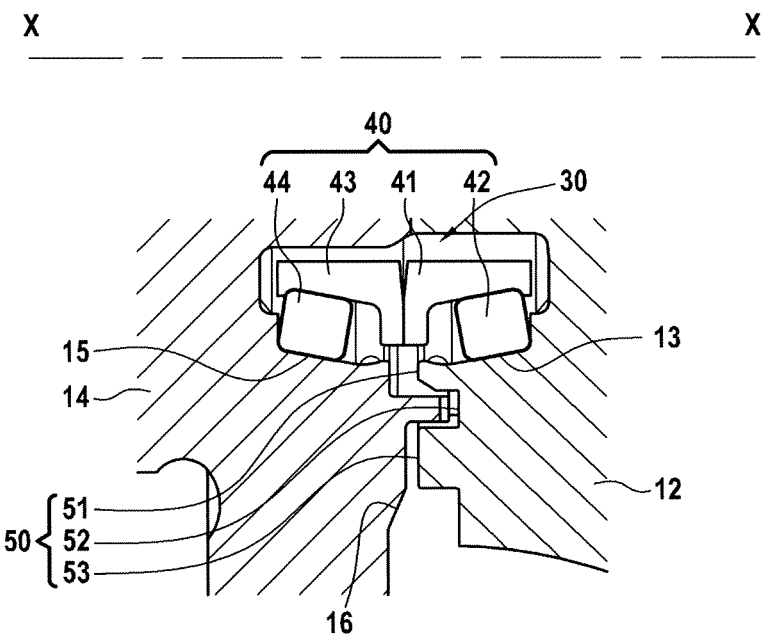
FIG. 3 is another cross-sectional view of a sealing element according to another aspect of the present disclosure.

FIG. 3 represents one example of a sectional view along a section not comprising the planer 60. The duct 50 defining a baffle as defined above is shown here, the part of the first segment 12 of the casing 1 comprising the planer 60 being here truncated.

The planer 60 is typically derived from casting with the casing segment in which it is formed.

The planer 60 is generally typically oriented downwardly of the hydraulic machine, vis-à-vis the direction of earth's gravity, which moves the particles away from the inlet of the duct 50. The planer 60 scrapes the material deposited on a cylinder portion over a radius greater than that of the external low walls carrying the holes 70.

For the tracked machines, the planer 60 is typically oriented downwardly of and away from, typically opposite to, the area where the track joins a sprocket carried by the hydraulic machine comprising the casing 1, such that the movement of the track does not force mud in the vicinity of the planer 60. The planer 60 is typically oriented downwardly and on the side of the track which leaves the sprocket to benefit from the movement of the track bit that tends to move the mud away from the window of the planer 60.

The planer 60 is typically symmetrical and placed on either side of the axis of symmetry passing through the mud compaction area for a track, so that it can operate on the right as well as on the left. The planer 60 can be more or less long, or in two separate parts, the surface ensuring the scraping being symmetrical with respect to said axis of symmetry of the mud compression area.

The planer 60 is typically made in an area of the first casing segment 12 having an extra thickness over an angular sector comprised between 5 and 15°, for example equal to 10°. The planer 60 is typically made by circular machining in an extra thickness of the first casing segment 12.

The planer 60 is typically dimensioned so as not to come into contact with fixing screws, bolts or nuts associated with the casing 1.

The casing 1 can include two planers 60, so as to form a right machine and a left machine, allowing both sides of a machinery or vehicle to be equipped with a similar hydraulic machine.

As indicated above, the holes 70 are bores formed in the casing 1, in the low walls or protrusions of the first segment 12 and of the second segment 14 of the casing 1, and defining passages between the surrounding medium and the housing 30 having an increased section with respect to the duct 50. The holes 70 are in particular devoid of sections forming baffles or obstacles.

Figure 4:
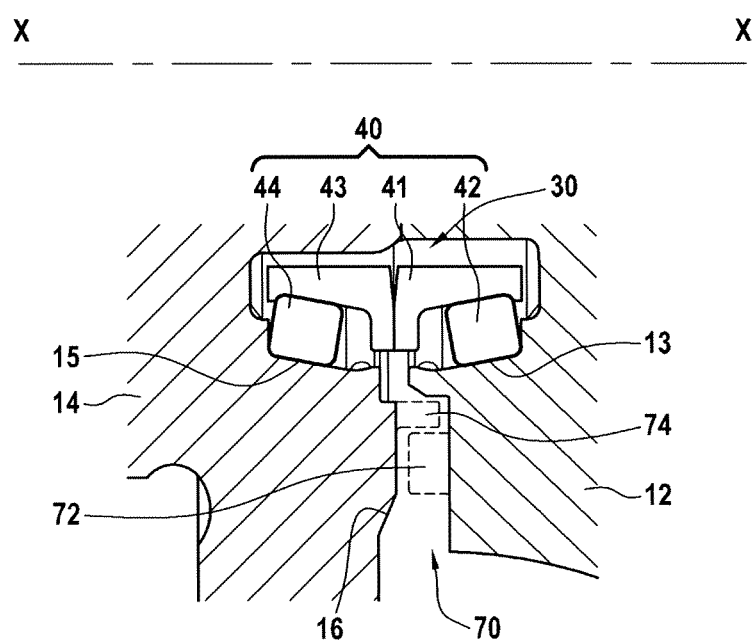
FIG. 4 is another cross-sectional view of a sealing element according to another aspect of the present disclosure.

FIG. 4 illustrates one exemplary embodiment of the holes 70. It is seen in this figure that portions of the first segment 12 and of the second segment 14 of the casing 1 defining the duct 50 have been truncated. In the example illustrated in the figures, the truncated portions in the first segment 12 define outer holes 72, and the truncated portions in the second segment 14 define inner holes 74. The truncated portions are indicated in dotted lines in FIG. 4. The truncated portions forming the outer holes 72 and the inner holes 74 can be formed by casting, or by machining.

When the inner holes 74 and the outer holes 72 are aligned, they define a duct having a generally rectangular section when the truncated portions of the first segment 12 and of the second segment 14 of the casing 1 are aligned, as visible in FIG. 4.

When the inner holes 74 and the outer holes 72 are not aligned, there is a form of a baffle in the duct 50, and a minimum section equal to S2 or S3, which allows avoiding the entry of pollution through the duct 50.

All or part of the outer holes 72 formed in the first fixed segment 12 of the casing 1 are typically configured so as to be oriented downwards when the casing is mounted in a vehicle or a machinery, typically in an angular sector of 45° centered along the direction of gravity, or along a direction defined by a fixing flange of the casing 1 on a vehicle.

For example, the first segment 12 of the casing 1 has truncated portions defining outer holes 72 distributed on either side of the planer 60, for example three truncated portions on either side of the planer 60. The second segment 14 of the casing 1 may for example have truncated portions defining inner holes 74 evenly distributed about the axis of rotation X-X.

Figure 5:
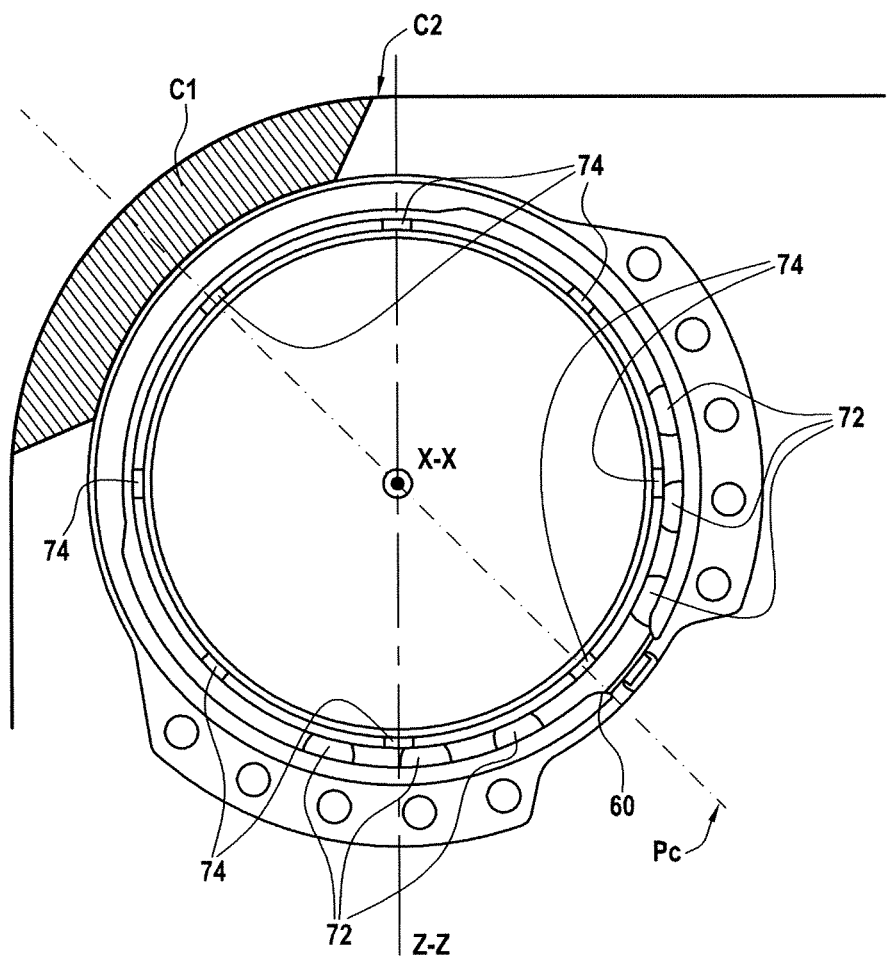
FIG. 5 is an axial cross-sectional view of a casing according to another aspect of the present disclosure.

FIG. 5 shows a sectional view of a casing 1 along a plane perpendicular to the axis of rotation X-X, illustrating one example of configuration.

This figure schematically represents a sector for driving C1 a vehicle track C2. This driving sector C1 is centered on a plane Pc inclined at 45° with respect to the vertical direction here schematized by the axis Z-Z, corresponding to the direction defined by gravity, or by the direction defined by a fixing flange of the casing 1 on a vehicle. The driving sector C1 typically corresponds to a mud accumulation area in the case of a tracked vehicle.

As seen in the figure, the planer 60 is diametrically opposite to the driving sector C1, and is typically centered on the plane Pc.

It is seen in this figure that the casing 1 comprises two sets of three outer holes 72 distributed on either side of the planer 60, and 8 inner holes 74 evenly distributed about the axis of rotation X-X. As can be seen in FIG. 5, the outer holes 72 are thus spaced from the driving sector C1, which allows preventing the mud that may accumulate in the driving sector C1 from reaching the outer holes 72.

The inner holes 74 and the outer holes 72 typically have a cylindrical section of revolution along a radial direction with respect to the axis of rotation X-X, and open out radially outwards. In the example illustrated in FIG. 4, the outer holes 72 have walls forming an arc of a circle or a segment of an ellipse or a parabola. The holes 70 generally have the shape of a radial groove, with a relief oriented towards the surrounding medium to facilitate the discharge of the material.

The holes 70 have the function of ensuring a discharge of any residues or particles which would have nevertheless penetrated into the housing 30. Each low wall or protrusion comprises openings. During the rotation, when the openings of the second portion 52 are facing the openings of the third portion 53, the particles present in the duct 50 can be discharged.

If dried mud or fine particles have entered the duct 50, they will break when the hydraulic machine is restarted and flow downwards by passing through the holes 70, which will empty the duct 50. In addition, this protects the duct 50 from water flows.

To allow the use of the casing 1 both on the right and on the left of a machine, holes are placed symmetrically with respect to the axis of symmetry of the fixing clamps of the fixed portion 12 of the casing 1 on the frame of a machine.

The casing as presented is in particular intended to comprise a hydraulic machine intended to conduct rotational driving on machines, machineries or vehicles exposed to aggressive environments in terms of contaminants, particles and wear. A hydraulic machine comprising a casing as proposed can be particularly suitable for translational driving of construction machines, agricultural machines, machineries or vehicles, and more particularly suitable for the driving of tracked transmissions.

Although the present invention has been described with reference to specific exemplary embodiments, it is obvious that modifications and changes can be made to these examples without departing from the general scope of the invention as defined by the claims. Particularly, individual characteristics of the different illustrated/mentioned embodiments can be combined in additional embodiments. Accordingly, the description and the drawings should be considered in an illustrative rather than restrictive sense.

It is also clear that all the characteristics described with reference to one method can be transposed, alone or in combination, to one device, and conversely, all the characteristics described with reference to one device can be transposed, alone or in combination, to one method.

The invention claimed is:

1. A casing for a rotating machine comprising a first casing segment, and a second casing segment movable in rotation with respect to the first casing segment along an axis of rotation, the first casing segment and the second casing segment defining an internal volume and being in contact along an interface, the interface between the first casing segment and the second casing segment being provided with a sealing element, said sealing element being positioned in a housing connected to the internal volume of the casing, and to the surrounding medium, the connection between the housing and the surrounding medium being made via a duct,
   wherein one of the first casing segment and the second casing segment comprises a planer positioned at an outer end of the duct,
   wherein the duct comprises ribs formed in the first casing segment and in the second casing segment so as to form baffles in said duct, and wherein the first casing segment and/or the second casing segment have bores formed in said ribs, so as to define passages between the housing and the surrounding medium,
   wherein the first casing segment and the second casing segment have bores formed in the said ribs, forming respectively outer holes and inner holes, so as to define passages between the housing and the surrounding medium when said outer holes and inner holes are aligned, the duct connecting the housing to the surrounding medium comprises a first portion, a second portion and a third portion, extending successively along a radial direction with respect to the axis of rotation from the housing towards the surrounding medium, the first portion, the second portion and the third portion each extending radially with respect to the axis of rotation, and being formed such that two successive portions are not aligned radially with respect to the axis of rotation and
   wherein the first portion has a first section, the second portion has a second section and the third portion of the duct has a third section, wherein said first section is larger than said second section and said second section is larger than said third section.

2. The casing according to claim 1, wherein the sealing element is an axial seal.

3. The casing according to claim 2, wherein said axial seal comprises a first metal ring, a second metal ring, a first elastomeric ring and a second elastomeric ring, the first metal ring and the second metal ring being mounted bearing against each other along an axial direction defined by the axis of rotation, the first elastomeric ring being interposed between the first metal ring and a wall of the first casing segment, and the second elastomeric ring being interposed between the second metal ring and a wall of the second casing segment.

4. The casing according to claim 1, wherein the planer is formed on the first casing segment.

5. The casing according to claim 4, wherein the planer is formed by a wall of the first casing segment, inclined with respect to the axis of rotation.

6. The casing according to claim 1, wherein the planer is configured so as to scan, during the rotation of the hydraulic machine, a cylinder portion located radially around the outer holes of the casing.

7. The casing according to claim 1, wherein the outer holes and the inner holes have a cylindrical section of revolution, extending radially with respect to the axis of rotation.

8. The casing according to claim 1, comprising two sets of outer holes, disposed on either side of the planer.

9. A tracked vehicle comprising a hydraulic machine provided with a casing according to claim 1, for the driving of a track, wherein the planer is placed symmetrically with respect to a mud compaction area of the hydraulic machine.

10. The vehicle according to claim 9, wherein the hydraulic machine is provided with a casing according to claim 1, and wherein all or part of the outer holes are made so as to be oriented downwardly the casing with respect to the direction of gravity.

* * * * *